(12) United States Patent
Hirsch

(10) Patent No.: US 9,555,498 B2
(45) Date of Patent: Jan. 31, 2017

(54) RESISTANCE WELDING MACHINE PINCH POINT SAFETY SENSOR

(76) Inventor: Roger Hirsch, Evanston, IL (US)

(*) Notice: Subject to any disclaimer, the term of this patent is extended or adjusted under 35 U.S.C. 154(b) by 1206 days.

(21) Appl. No.: 12/159,076

(22) PCT Filed: Dec. 21, 2006

(86) PCT No.: PCT/US2006/049131
§ 371 (c)(1),
(2), (4) Date: Jun. 24, 2008

(87) PCT Pub. No.: WO2007/079041
PCT Pub. Date: Jul. 12, 2007

(65) Prior Publication Data
US 2008/0302766 A1    Dec. 11, 2008

Related U.S. Application Data

(60) Provisional application No. 60/755,434, filed on Dec. 30, 2005.

(51) Int. Cl.
*B23K 11/25* (2006.01)
*B23K 11/11* (2006.01)

(52) U.S. Cl.
CPC .............. *B23K 11/115* (2013.01); *B23K 11/25* (2013.01)

(58) Field of Classification Search
CPC ........ B23K 11/115; B23K 11/11; B23K 11/36; B23K 11/24; B23K 11/315; B23K 11/241; B23K 11/257; B23K 9/1006; B23K 11/25; B23K 11/314; B23K 31/125; B23K 9/095; B23K 11/002; B23K 11/252; B23K 9/9056; B23K 11/30; B23K 13/08

USPC .............. 219/108, 86.1, 86.21–86.25, 86.41,219/86.51, 87, 89, 110, 111
See application file for complete search history.

(56) References Cited

U.S. PATENT DOCUMENTS

| | | | | |
|---|---|---|---|---|
| 2,435,577 | A | * | 2/1948 | Dawson ...................... 219/86.33 |
| 2,617,913 | A | * | 11/1952 | Oestreicher .............. 219/130.32 |
| 2,874,960 | A | * | 2/1959 | Vernon Durbin et al. ..... 310/93 |
| 3,041,437 | A | * | 6/1962 | Carissimi ................. 219/448.16 |
| 3,191,441 | A | * | 6/1965 | Erickson ...................... 73/432.1 |
| 3,404,251 | A | * | 10/1968 | Hubbard ....................... 219/108 |

(Continued)

OTHER PUBLICATIONS

Hirsch, Roger, "Keeping Spot Welder Operators Safe," [retrieved on Aug. 12, 2016], retrieved from the internet <URL: http://www.unitrol-electronics.com (Internet Archive, Way Back machine)> Nov. 4, 2005, entire document (5 pages).

(Continued)

*Primary Examiner* — Eric Stapleton
(74) *Attorney, Agent, or Firm* — Brinks Gilson & Lione

(57) ABSTRACT

There is described a continuity sensing system that operates with a resistance-welding machine. This sensing system measures continuity between the welding electrodes after the welding machine has been initiated and prevents application of high electrode force between the electrodes if the continuity measured is below a reference level. The result is a fully passive system that prevents serious high electrode force that would cause serious pinch-point injury to the operator of the welder. The present invention also includes methods of controlling pneumatic systems on resistance-welding machines to apply low force between welding electrodes until continuity between the welding electrodes has been detected.

16 Claims, 11 Drawing Sheets

(56) References Cited

U.S. PATENT DOCUMENTS

| | | | | |
|---|---|---|---|---|
| 3,404,252 A * | 10/1968 | Michael | | 219/110 |
| 3,414,808 A * | 12/1968 | Thomas | | 324/557 |
| 3,449,544 A * | 6/1969 | Needham | | 219/130.21 |
| 3,627,975 A * | 12/1971 | Goto | | 219/137.71 |
| 3,670,138 A * | 6/1972 | Schmiege et al. | | 219/114 |
| 3,686,891 A | 8/1972 | Wills | | |
| 3,708,648 A * | 1/1973 | Croucher et al. | | 219/109 |
| 3,731,149 A * | 5/1973 | Sherman et al. | | 361/4 |
| 3,737,751 A * | 6/1973 | Lima | | 318/463 |
| 3,770,989 A * | 11/1973 | Shaw | | 327/582 |
| 3,786,329 A * | 1/1974 | Whited | | 318/379 |
| 3,813,021 A | 5/1974 | Kramer | | |
| 3,838,244 A * | 9/1974 | Petrides et al. | | 219/130.5 |
| 3,854,076 A * | 12/1974 | Lambert | | 318/269 |
| 3,864,612 A * | 2/1975 | Whited | | 318/257 |
| 3,876,920 A * | 4/1975 | Meissen et al. | | 318/370 |
| 3,965,329 A * | 6/1976 | Petrides et al. | | 219/124.1 |
| 3,995,208 A * | 11/1976 | Parr | | 318/612 |
| 4,039,928 A * | 8/1977 | Noftsker et al. | | 323/326 |
| 4,041,272 A * | 8/1977 | Burton et al. | | 219/89 |
| 4,079,226 A | 3/1978 | Boyd et al. | | |
| 4,092,509 A * | 5/1978 | Mitchell | | 219/625 |
| 4,095,077 A * | 6/1978 | Schneider et al. | | 219/61 |
| 4,151,396 A * | 4/1979 | Veal | | 219/132 |
| 4,275,341 A * | 6/1981 | Huber et al. | | 318/376 |
| 4,289,948 A * | 9/1981 | Jurek et al. | | 219/110 |
| 4,301,351 A * | 11/1981 | Mathews | | 219/114 |
| 4,302,653 A * | 11/1981 | Denning et al. | | 219/110 |
| 4,329,561 A * | 5/1982 | Schafer et al. | | 219/110 |
| 4,386,299 A * | 5/1983 | Pham | | 318/261 |
| 4,388,569 A * | 6/1983 | Shipaev et al. | | 318/87 |
| 4,396,877 A * | 8/1983 | Egri et al. | | 318/261 |
| 4,423,363 A * | 12/1983 | Clark et al. | | 318/375 |
| 4,442,337 A * | 4/1984 | Nakata et al. | | 219/117.1 |
| 4,447,698 A | 5/1984 | Van Sikle et al. | | |
| 4,447,699 A * | 5/1984 | Gold et al. | | 219/110 |
| 4,447,700 A * | 5/1984 | Cohen | | 219/117.1 |
| 4,450,340 A * | 5/1984 | Corrigall et al. | | 219/132 |
| 4,456,809 A * | 6/1984 | Jones et al. | | 219/108 |
| 4,459,459 A | 7/1984 | Overman | | |
| 4,503,312 A * | 3/1985 | Nakata et al. | | 219/117.1 |
| 4,517,439 A * | 5/1985 | Colley | | 219/130.33 |
| 4,529,919 A * | 7/1985 | Melocik et al. | | 318/373 |
| 4,555,652 A * | 11/1985 | Brulard | | 318/375 |
| 4,568,864 A * | 2/1986 | Gisske | | 318/294 |
| 4,570,050 A * | 2/1986 | Veal et al. | | 219/130.31 |
| 4,596,917 A * | 6/1986 | Nied et al. | | 219/109 |
| 4,631,383 A * | 12/1986 | Haggett | | 219/78.01 |
| 4,644,138 A * | 2/1987 | Walsh | | 219/501 |
| 4,672,277 A * | 6/1987 | Makinen et al. | | 318/380 |
| 4,680,441 A * | 7/1987 | McKendrick | | 219/91.1 |
| 4,694,135 A * | 9/1987 | Nagel et al. | | 219/110 |
| 4,733,042 A * | 3/1988 | Nishiwaki et al. | | 219/89 |
| 4,792,734 A * | 12/1988 | Watanabe | | 318/269 |
| 4,816,726 A * | 3/1989 | Novis et al. | | 318/293 |
| 4,922,161 A * | 5/1990 | Gilliland et al. | | 318/269 |
| 4,990,837 A * | 2/1991 | Ishitobi | | 318/375 |
| 5,187,348 A * | 2/1993 | Cuba et al. | | 219/124.02 |
| 5,245,546 A * | 9/1993 | Iceland | | 700/212 |
| 5,252,802 A | 10/1993 | Raycher | | |
| 5,254,828 A * | 10/1993 | Stiebel | | 219/110 |
| 5,361,022 A * | 11/1994 | Brown | | 318/375 |
| 5,406,044 A * | 4/1995 | Killian et al. | | 219/99 |
| 5,436,427 A * | 7/1995 | Bourque | | 219/130.1 |
| 5,449,992 A * | 9/1995 | Geiger et al. | | 318/362 |
| 5,484,976 A * | 1/1996 | Sbalchiero et al. | | 219/110 |
| 5,484,986 A * | 1/1996 | Fantazian et al. | | 219/86.41 |
| 5,498,944 A * | 3/1996 | Nakata | | 318/640 |
| 5,517,093 A * | 5/1996 | Augustyniak et al. | | 318/63 |
| 5,558,785 A * | 9/1996 | Killian et al. | | 219/110 |
| 5,645,738 A * | 7/1997 | Cecil | | 219/110 |
| 5,652,488 A * | 7/1997 | Rennau | | 318/568.16 |
| 5,760,361 A * | 6/1998 | Dew et al. | | 219/108 |
| 5,818,184 A * | 10/1998 | Kim | | 318/375 |
| 5,821,491 A * | 10/1998 | Dew et al. | | 219/108 |
| 5,898,285 A * | 4/1999 | Nagasawa et al. | | 318/568.13 |
| 5,936,495 A * | 8/1999 | LeCourt | | 335/6 |
| 5,945,011 A * | 8/1999 | Takano et al. | | 219/108 |
| 5,969,303 A * | 10/1999 | Piserchia et al. | | 187/297 |
| 5,988,486 A * | 11/1999 | Kobayashi et al. | | 228/212 |
| 6,018,729 A * | 1/2000 | Zacharia et al. | | 706/21 |
| 6,028,290 A | 2/2000 | Yasuhara et al. | | |
| 6,131,429 A * | 10/2000 | Ward | | 72/1 |
| 6,172,884 B1 * | 1/2001 | Lanni | | 363/21.05 |
| 6,236,177 B1 * | 5/2001 | Zick et al. | | 318/362 |
| RE37,607 E * | 3/2002 | Cecil | | 219/110 |
| 6,359,249 B1 * | 3/2002 | Brown et al. | | 219/86.51 |
| 6,404,155 B1 * | 6/2002 | Funayama et al. | | 318/293 |
| 6,483,268 B1 * | 11/2002 | Cummins | | 318/362 |
| 6,515,251 B1 * | 2/2003 | Wind | | 219/86.1 |
| 6,650,515 B2 * | 11/2003 | Schmalz | | 361/42 |
| 7,012,392 B2 * | 3/2006 | Nguyen et al. | | 318/376 |
| 7,034,476 B2 * | 4/2006 | Wang et al. | | 318/139 |
| 7,308,352 B2 * | 12/2007 | Wang et al. | | 701/70 |
| 2003/0048006 A1 * | 3/2003 | Shelter et al. | | 307/64 |
| 2004/0074884 A1 * | 4/2004 | Butler et al. | | 219/130.4 |
| 2005/0024907 A1 * | 2/2005 | Lanni | | 363/144 |
| 2005/0194923 A1 * | 9/2005 | Huang et al. | | 318/701 |
| 2008/0302766 A1 * | 12/2008 | Hirsch | | 219/108 |

OTHER PUBLICATIONS

Written Opinion and International Search Report for corresponding Application No. PCT/US06/49131 mailed Mar. 11, 2008.

Canadian Office Action for corresponding Application No. 2,640,891 mailed Nov. 6, 2015.

\* cited by examiner

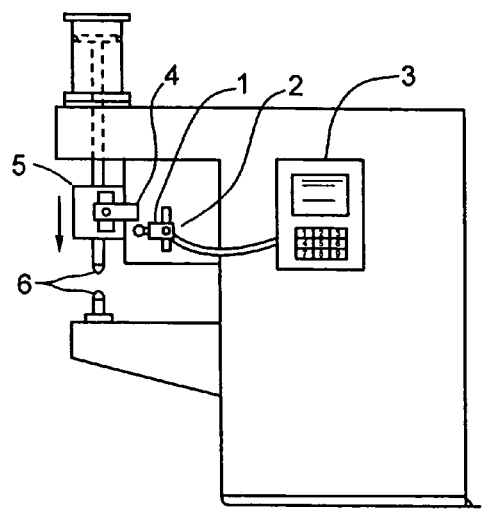
PRIOR ART FIG.1
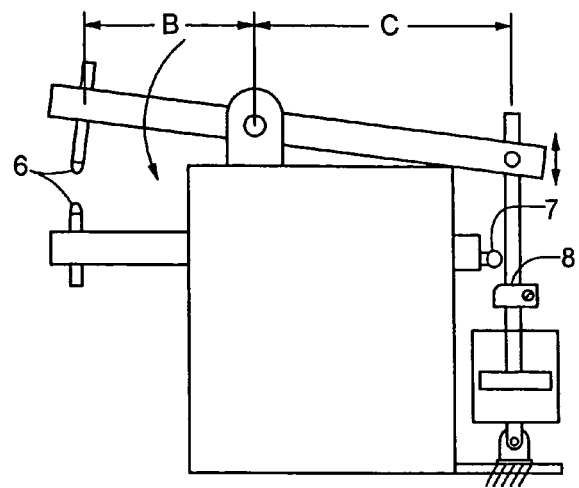
PRIOR ART FIG.2
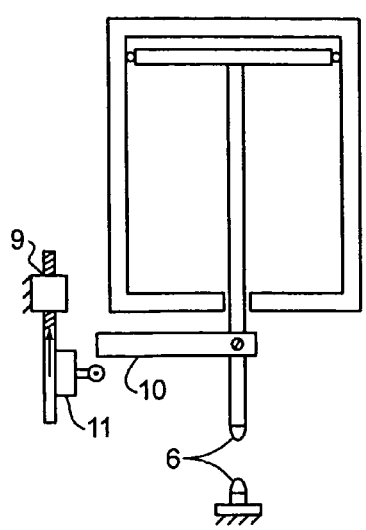
FIG.3
PRIOR ART
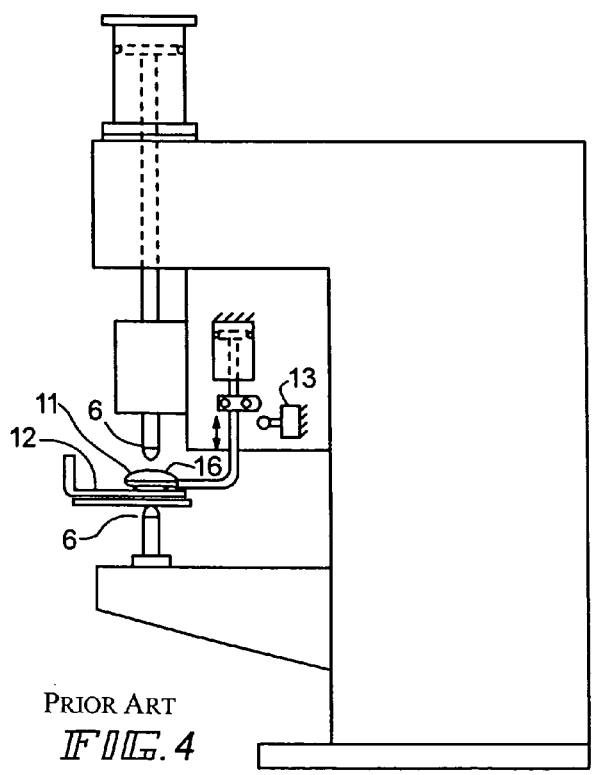
PRIOR ART FIG.4

RESISTANCE WELDING MACHINE PINCH POINT SAFETY SENSOR

CROSS-REFERENCE TO RELATED APPLICATIONS

This application is a National Stage application of International Application No. PCT/US2006/049131, filed Dec. 21, 2006, titled "Resistance Welding Machine Pinch Point Safety Sensor," which claims the benefit of U.S. Provisional Application No. 60/755,434, filed Dec. 30, 2005.

BACKGROUND OF INVENTION

1. Need for Pinch-Point Protection

Operators of resistance (spot) welding machines are often exposed to potentially serious injury due to the pinch point area between the welding electrodes. A typical resistance welder operates with electrode forces of 113.4 kg (250 lbs) to 2.268 metric tons (5000 lbs.) and higher. Because the force is concentrated on a very small contact surface of the electrode, the force density is extremely high and can easily cause permanent finger injury or total amputation.

For example, on a welder with 272.4 kg (600 lbs.) of electrode force and a 25.4 mm (¼") contact surface, the force density at the pinch point is 5.547 metric tons/25.4 $mm^2$ (12,229 lb/in). Because a common application of a resistance welding machine requires the operator to load parts between the electrodes as well as keep their hands on these parts during the welding sequence, the possibility for serious injury is present on a daily basis. This invention eliminates serious pinch-point injury by reducing the force between electrodes to a very low level when the operator's finger or other body part is between the electrodes.

2. Field of Invention

The present invention relates to a monitoring system having voltage pickup wires or contacts connected to the resistance-welding machine's transformer secondary pads or primary input lines. This connection creates a signal which is conditioned and then compared to a voltage reference signal. The output of this sensor system connects to a permissive input on the welding control and through fail-safe logic therein prevents energizing of solenoid valves or other systems that would apply high force between the welder's electrodes until metal has been detected between the these electrodes. Methods are also claimed that will reduce welder ram dead weight to an acceptable level prior to application of high electrode force.

3. Prior Art

A typical prior art arrangement will be described with reference to FIGS. 1 to 4. In one form of the prior art arrangement used on direct action welders ("press welders") and shown in FIG. 1, a limit switch 1 is mounted on a fixed portion of the resistance-welding machine frame 2 and wired to the welder's control circuitry 3. An adjustable finger 4 is mounted on the moving ram 5 and is adjusted so that the limit switch closes only after the ram has lowered to the point where space between the electrodes 6 is below the desired dimension (typically about 25.4 mm (¼")). After the initiation switch has been closed, the welder's ram 5 falls by gravity, or has some other mechanism to restrict force between the electrodes until the limit switch 1 has closed. The control circuitry 3, then turns another output on to place full welding force between the electrodes 6.

A second form of the prior art arrangement is used on rocker arm type welders and shown in FIG. 2. Force at electrodes 6 is derived from the force out of the rear piston multiplied by the mechanical advantage of arms C/B. A limit switch 7 for this prior art device is mounted on a fixed portion of the welder frame 2, and an adjustable finger 8 is installed on some portion of the welder's moving cylinder mechanism 9. This finger 8 is adjusted so that the limit switch 7 closes only after the electrodes 6 have closed to the point where space between them is below the desired dimension (typically about 25.4 mm (¼"). The control then turns another output on to place full welding force between the electrodes 6. However in both of the above prior arrangements, setting of the limit switch finger 4 or 8 is done by the operator or setup person, and the accuracy of this setting is fully in the hands of this person's skill. Furthermore, if the electrodes 6 are moved during normal production or subsequent electrode replacement or adjustment, and the limit switch is not adjusted properly, the safety of the system is compromised.

A third form of the prior art arrangement, as shown in FIG. 3, utilizes a system actuated by a motor 9 to close a limit switch 11 (or limit switch cam). During a setup sequence, an air cylinder is activated to bring the electrodes 6 together. Then the motor 9 moves the switch 11 or cam until the switch is closed by the cam, and then backs it up until a specific dimension (typically about 25.4 mm (¼") has been reached. During each welding sequence, electrodes 6 are moved together under reduced force until the limit switch 11 has been closed. The control then turns another output on to place full welding force between the electrodes 6.

This prior art allows automatic setting of the correct spacing between electrodes 6. However, in this third prior art arrangement, proper setting of the cam is mechanical and subject to mechanical adjustment errors. Additionally, as with the first two forms, if the electrodes 6 spacing is changed during normal production or subsequent electrode replacement or adjustment, and the operator does not remember to reset the finger the safety of the system is compromised.

A fourth form of the prior art arrangement, as shown in FIG. 4, utilizes a mechanically or pneumatically moved sensing arm (sometimes called "ring guard") 11. When the welder is energized during each welding cycle, the electrodes 6 do not move forward, but this sensing arm 11, lowers to touch ring 11a to the part 12 being welded. Sensing arm 11 is mechanically designed to encompass the area around the electrodes 6. If the distance traveled is past the set point on a limit switch 13, the sensing arm 11 will retract and the electrodes 6 will be closed under full welding force. If ring 11a on the sensing arm 11 does not move this minimum set distance, as would happen when the operator's finger or other body part is under ring 11a the sensing arm 11 will retract but the welder control will not cause the electrodes 6 to close.

However, in this fourth prior art arrangement if the welder operator or setup person does not adjust the sensing arm 11 properly, high force can be applied between the welding electrodes 6 even though the operator's finger or other body part is between the electrodes. Further, just bending this sensing arm 11 out of the proper sensing zone renders this system totally useless.

SUMMARY OF THE INVENTION

The present invention is intended to solve the problems of the prior art pinch point protection for resistance-welding machines. This sensing system measures continuity between the welding electrodes after the welding machine has been initiated and prevents application of high electrode force between the electrodes if the continuity measured is below a reference level. The result is a fully passive system that prevents serious high electrode force that would cause serious pinch-point injury to the operator of the welder.

OBJECTS AND ADVANTAGES OF THE INVENTION

It is the object of the invention to provide a pinch point sensing device of the character described.

Another object of the present invention to provide a passive sensing system that will only allow high electrode force to be applied between welding electrodes if continuity between the electrodes has been detected, whereby the electrodes will clamp only on any low-resistance material, but will not clamp on a high-resistance material such as an operator's finger or other body part.

Another object is to provide internal sensing of continuity between the welding electrodes whereby no operator adjustments can be made in either the continuity sensing system or the internal control logic, and, additionally, since the continuity sensing is independent of electrode position, the sensing system will protect the pinch point area even if spacing between the electrodes is changed.

Another object is to provide switching from low to high electrode force which permits limiting electrode force prior to continuity detection and still provides pinch point protection.

Another object is to provide a method to reduce force between electrodes when the welder ram is closed under the force of gravity.

The above and other objects, features and advantages of the present invention will become more apparent from the following description taken in conjunction with the accompanying drawings.

BRIEF DESCRIPTION OF THE DRAWINGS

FIGS. 1-4, as previously discussed, illustrate prior art systems attempting to provide suitable pinch point protection for welding machines.

PREFERRED EMBODIMENTS OF THE INVENTION

A resistance-welding machine according to a preferred embodiments of the invention will be described with reference to FIGS. 5 through 19.

Figure 5:
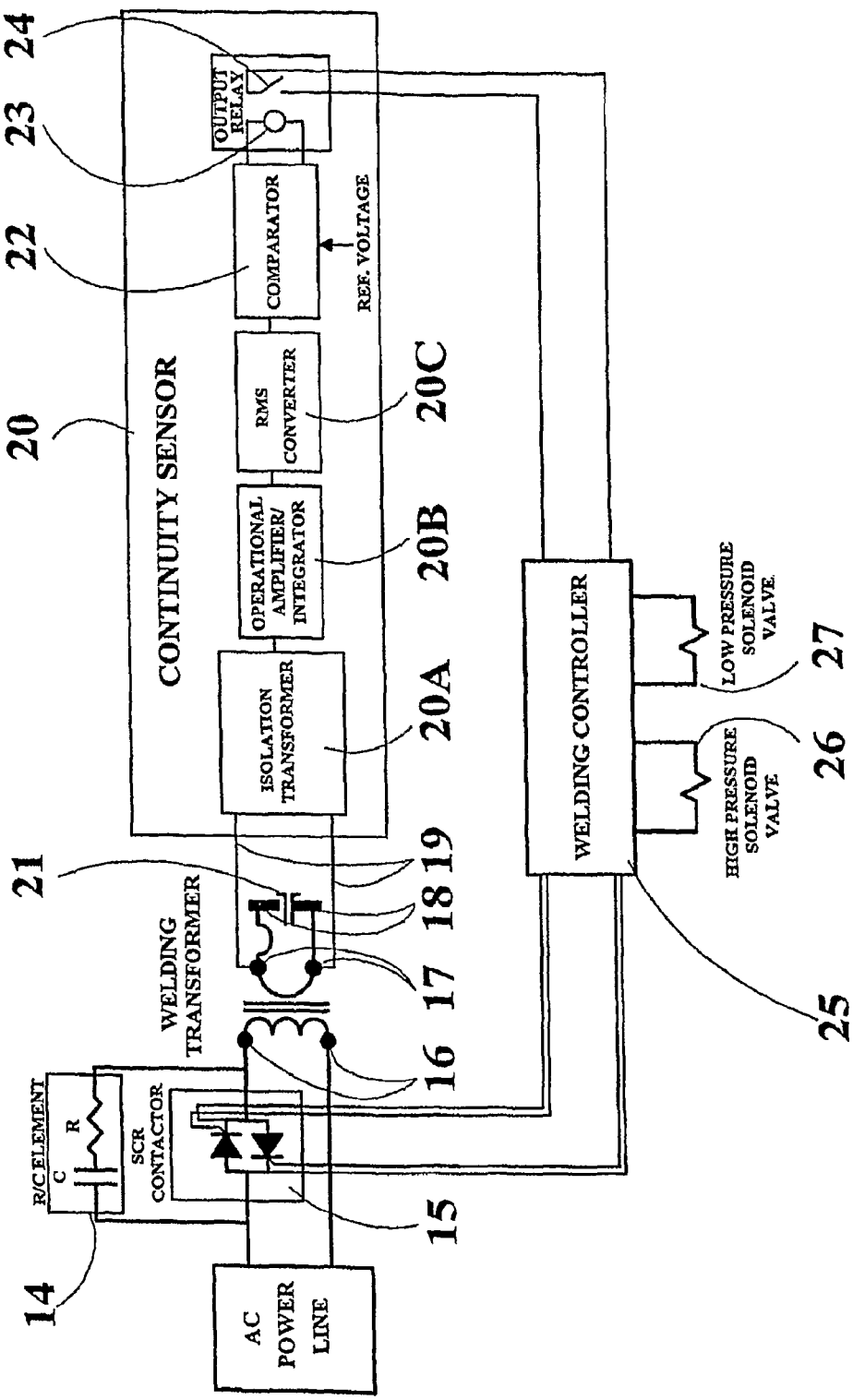
FIG. 5 is a block diagram of a system embodying the present invention using only a continuity sensor where the sensor signal is obtained from the secondary (low voltage) side of the welding transformer according to a preferred embodiment of the present invention, which is the most common type of system.

FIG. 5 shows the electronic diagram of a typical resistance-welding machine that has only a continuity sensor 20 as the detection system, with components of the preferred embodiment of the invention. When the welding electrodes 18 are not in contact, a low voltage leakage is developed by a resistor/capacitor element 14, connected across the SCR contactor 15 to put low voltage on the welding transformer's primary side 16. The continuity sensor 20 may also include an isolation transformer 20A, an operational amplified/integrator 20B and a RMS converter 20C, as shown in FIG. 5.

This voltage is transmitted inductively to the welding transformer's secondary 17 and to the welding electrodes 18. A pair of wires 19 or contacts are connected across the welding transformer's secondary 17, ideally at the points closest to the transformer's output keep the sensor wires out of the mechanical area of the welder, and to the input of the continuity sensor 20.

During a welding sequence, the welding controller 25 energizes low-pressure solenoid valve, 27. The welding electrodes 18 are now brought together under low force by the welding controller. If these welding electrodes 18 contact low-resistance metal to be welded, impedance of the welder secondary 17 is lowered.

Since the available current from the R/C element 14 is very low, the lowered impedance of the secondary 17 greatly reduces voltage from this R/C element on the transformer primary 16 to inductively reduce voltage on the transformer secondary 17. This lowered voltage at the secondary 17 is transmitted through wires 19 to the input of the continuity sensor, 20. The first stage of the continuity sensor 20 conditions this input voltage. The conditioned voltage is fed into a comparator 22. If this conditioned input voltage level goes below the comparator's reference voltage relay 23 is energized. Normally open contacts 24 on this relay are closed to signal the welding controller 25 that continuity has been detected between the electrodes 18.

Adjustment of the internal reference voltage will match electrical response of the welder to closed and open electrode conditions for different types of welders. At this time, logic in the welding controller 25 energizes a solenoid valve 26 to put full welding force between welding electrodes 18. However, if this conditioned reference voltage fails to go below the reference voltage of the comparator 22 within a time limit, the controller 25 releases low-pressure solenoid valve 27, and the electrodes 18 open without ever reaching full force. At the same time, a diagnostic can be displayed on the welding controller 25.

Figure 6:
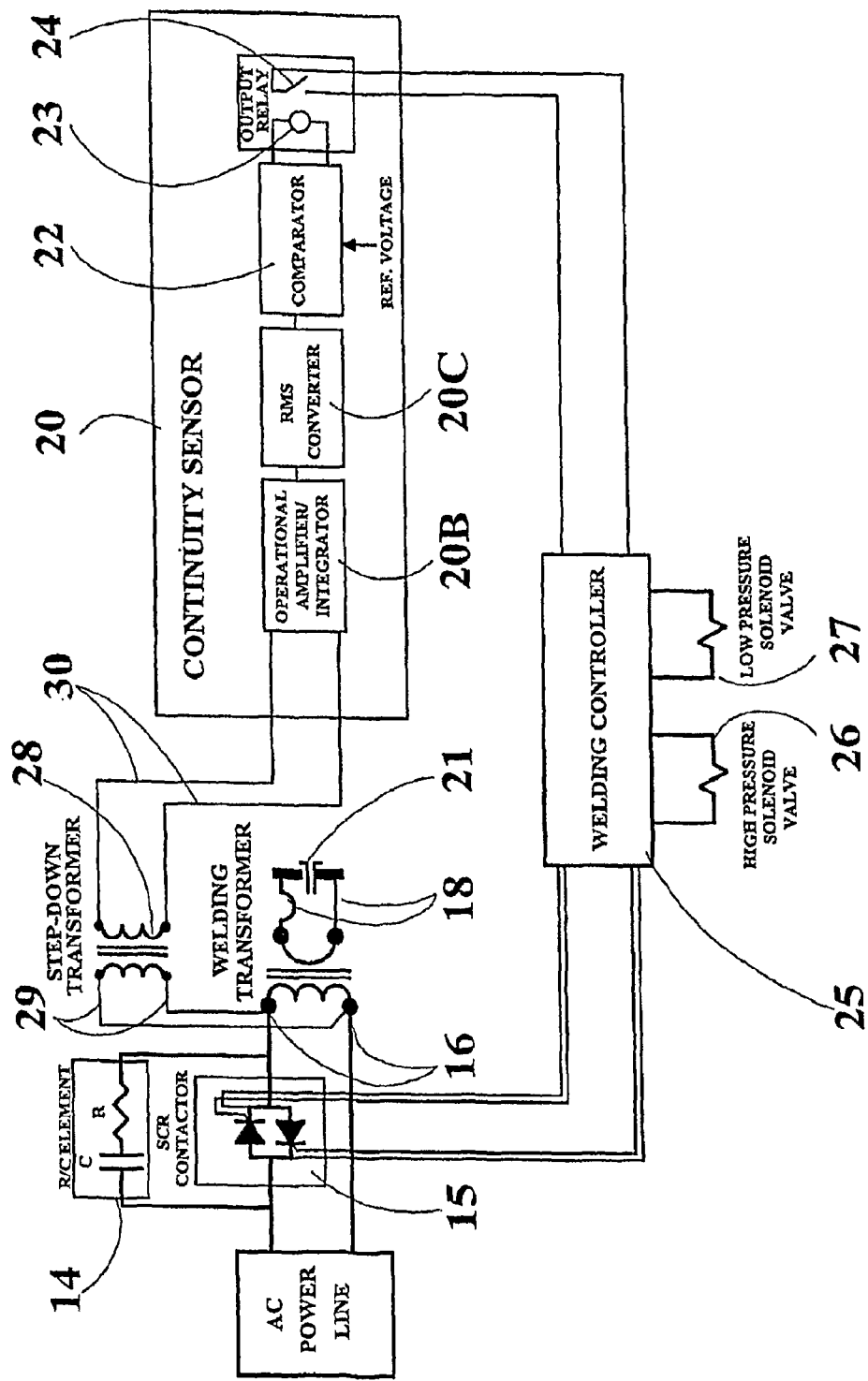
FIG. 6 is a block diagram of the novel system using only a continuity sensor where the sensor signal is obtained from the primary (high voltage) side of the welding transformer according to a preferred embodiment of the present invention, which is typically used for welders that have remote welding guns with integral transformers such as transguns.

Alternately, as shown in FIG. 6, a voltage parallel to the welding transformer's primary 16 is connected by wires 29 to a step-down transformer 28 and then to the input of the continuity sensor with wires 30. The circuitry of the continuity sensor 20 conditions this input signal to eliminate extraneous voltage and prevent high welding (or line) voltage from damaging the low-level circuitry in the system's comparator 22. Similar to FIG. 5, the continuity sensor 20 may also include an isolation transformer 20A, an operational amplified/integrator 20B and a RMS converter 20C, as shown in FIG. 6.

During a welding sequence, the welding controller 25, energizes low-pressure solenoid valve 27. If welding electrodes 18 contact low-resistance metal 21 being welded, impedence of the welding transformer's secondary is greatly lowered. Since the available current from the R/C element 14 is very low, the lowered impedance of the transformer's secondary reduces voltage from this R/C element on the transformer primary 16. This lowered and isolated voltage is transmitted through wires 29 through a step-down transformer 28 and to input of the continuity sensor 20. The first stage of the continuity sensor 20, conditions this input voltage. The conditioned voltage is fed into a comparator 22. If this conditioned input voltage level goes below the reference voltage of the comparator 22, relay 23 is energized. Normally open contacts 24 on this relay 23 are closed to signal the welding controller 25 that continuity has been detected between the electrodes 18.

Adjustment of the internal reference voltage will match electrical response of the welder to close and open electrode conditions for different types of welders. At this time, logic in the welding controller energizes a high pressure solenoid valve 26 to put full welding force between welding electrodes 18. However, if this conditioned reference voltage fails to go below the reference voltage of the comparator 22 within a time limit, the controller 25 releases low-pressure solenoid valve 27, and the electrodes 18 open without ever reaching full force. At the same time, a diagnostic can be displayed on the welding controller 25.

Figure 7:
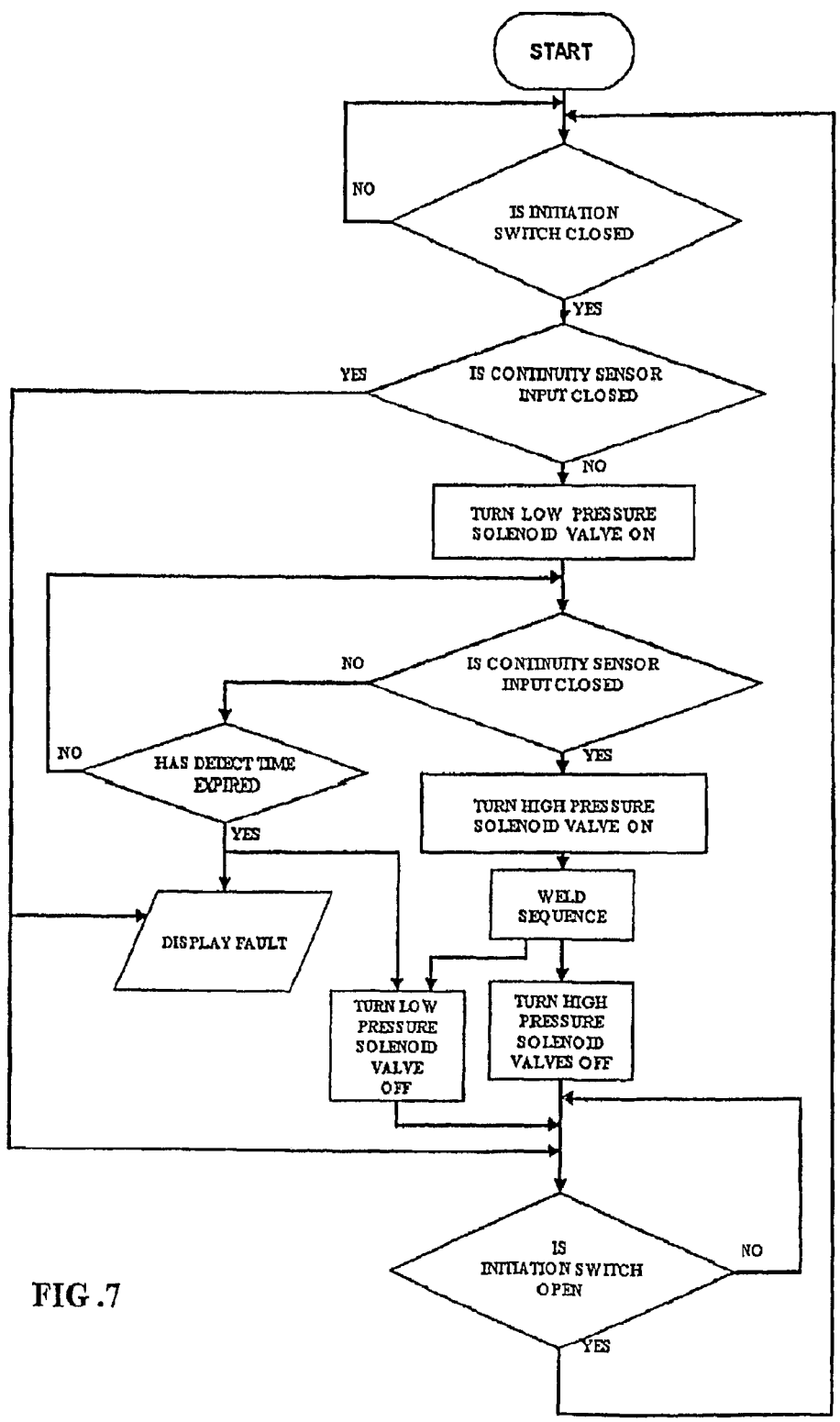
FIG. 7 is a flow chart showing the control logic for the block diagram of FIGS. 5 and 6. when only a continuity sensor system is used, in which case the continuity sensor must be closed for the system to allow high welding force to be applied

FIG. 7 shows the logic sequence according to the preferred embodiment of this invention on a welder using the electronic diagram of FIGS. 5 and 6. After the welder's initiation switch has been closed, the control checks to see if continuity sensor output relay contact 24 that is connected to the control "continuity sensor input" has closed.

Sequences of Operation (FIG. 5 and FIG. 6 embodiment)

Sequence 1: Continuity sensor input is not closed at start: The control turns on the low-pressure solenoid valve 27 to bring the electrodes closed under low force. The control continues to monitor the continuity sensor input.

Sequence 1a: If the continuity sensor input is not closed within the selected maximum set detect time, the low-force solenoid valve 27 is turned off to open the electrodes, a display fault is shown on the control, and the system locks out until the initiation switch has been opened.

Sequence 1b: If the continuity sensor input closes before the selected detect time has elapsed, the This arrangement is typically used for welding of parts that are not flat at the beginning of the welding sequence, or where a redundant sensor is desired.

The limit switch, like that shown in FIG. 1, is mechanically adjusted so that a cam will close this limit switch if electrodes 6 are closer than a desired dimension (typically about 25.4 mm (¼")). The same logic can be used on rocker arm welders using limit switch 7 and adjustable finger 8 in FIG. 2; and a motorized set limit switch 11 like that shown in FIG. 3 may be used.

Figure 8:
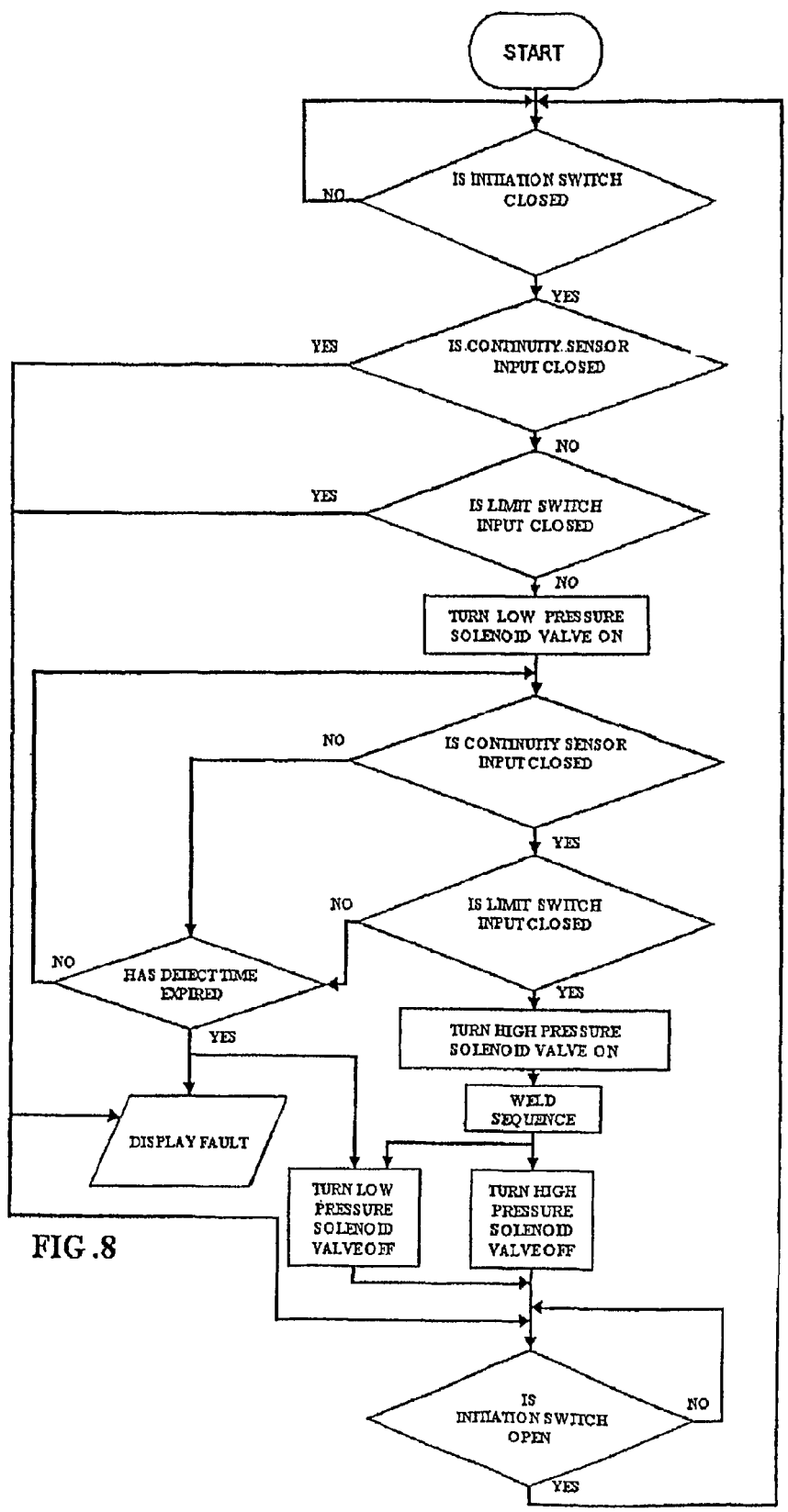
FIG. 8 is a flow chart showing the control logic for the block diagram of FIGS. 5 and 6. when both a continuity sensor and a limit switch system is used, so that both the continuity sensor and the limit switch must be closed for the system to allow high welding force to be applied.

The logic chart shown in FIG. 8 shows the logic sequence with this second detection element according to the preferred embodiment of this invention. After the welder's initiation switch has been closed, the control checks to see if both the continuity sensor input and the limit switch contacts have been closed Sequences of Operation (FIG. 8 Embodiment)

Sequence 1: Neither continuity sensor nor limit switch contact closure is detected at start: The control turns on the low-pressure solenoid valve to bring the electrodes closed under low force. The control continues to monitor both input signals.

Sequence 1a: If contact closure from both the continuity sensor and the limit switch are not detected within the predetermined selected detect time, the low-force solenoid valve is turned off to open the electrodes, a display fault is shown on the control, and the system locks out until the initiation switch has been opened.

Sequence 1b: If contact closure from both the continuity detector and the limit switch is detected before the detect time has elapsed, the high-force solenoid valve is energized to put full force on the electrodes. The control then goes through the weld sequence and finally turns off both solenoid valves to release the electrodes.

Sequence 2: Contact closure from either one or both inputs is detected at the start. Because this indicates a continuity circuit failure or faulty setting of the reference voltage, a short in the detector wires, or an improperly set or permanently closed limit switch, the control does not energize even the low-force solenoid valve and locks out waiting for the initiation switch to be opened before allowing the next attempted cycle.

Mechanical Methods for Attaining Low Approach Force.

Methods of mechanical operation to provide both low and high force between the electrodes are required to utilize the logic of the present invention. Different mechanical arrangements of pneumatic and other components are required to operate different types of resistance welding machines. This section covers the most common welding systems. However the use of the present invention is not limited to this machinery group.

Welders with Significant Ram Weight:

Force between electrodes produced by gravity closure (weight of the ram) alone on this type of welder is high enough to cause significant pinch point injury. FIG. 1 illustrates a press welder that typically utilizes a guided ram containing an electrode holder, and is activated by a cylinder. The cylinder can be operated directly or indirectly, by air, hydraulics, or a hybrid of the two.

In the preferred embodiment of this invention, a system is installed to partially counterbalance the gravity dead weight of the ram during the initial stages of each cycle and until continuity between the electrodes has been established.

Figure 9:
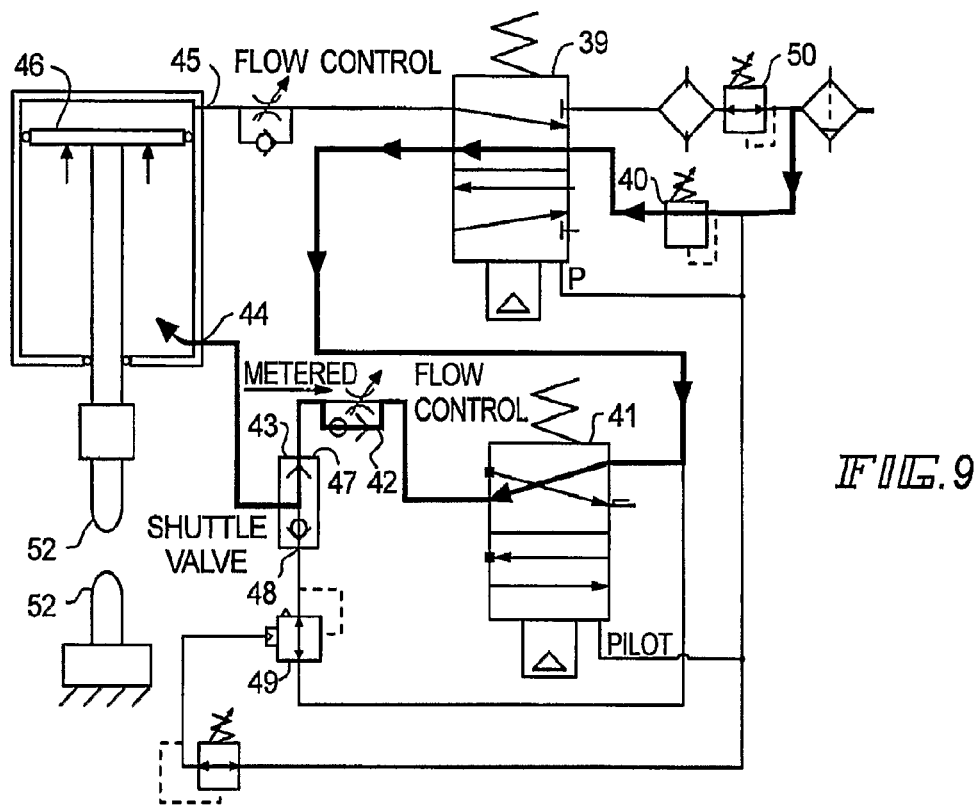
FIG. 9 is a pneumatic drawing showing a method embodying the present invention for preventing high force between the electrodes on welders with substantial ram weight, showing the welder at rest.

A preferred arrangement for a pneumatically operated cylinder to operate a press welder is shown in FIG. 9. In this figure, the welder is at rest with the electrodes fully opened. Line pressure air from 5-way solenoid valve 39 is reduced by regulator 40 and passes through 3-way solenoid valve 41 through flow control valve 42, to shuttle valve 43. Because at this time there is no air pressure on the other input port of this shuttle valve, this air passes through the shuttle valve 43 and then to the bottom of the air cylinder at port 44. Since there is no air pressure on the top cylinder port 45 air pressure on the underside of the welder cylinder piston 46 keeps the welder cylinder in the retracted position to keep the electrodes fully apart.

Figure 10:
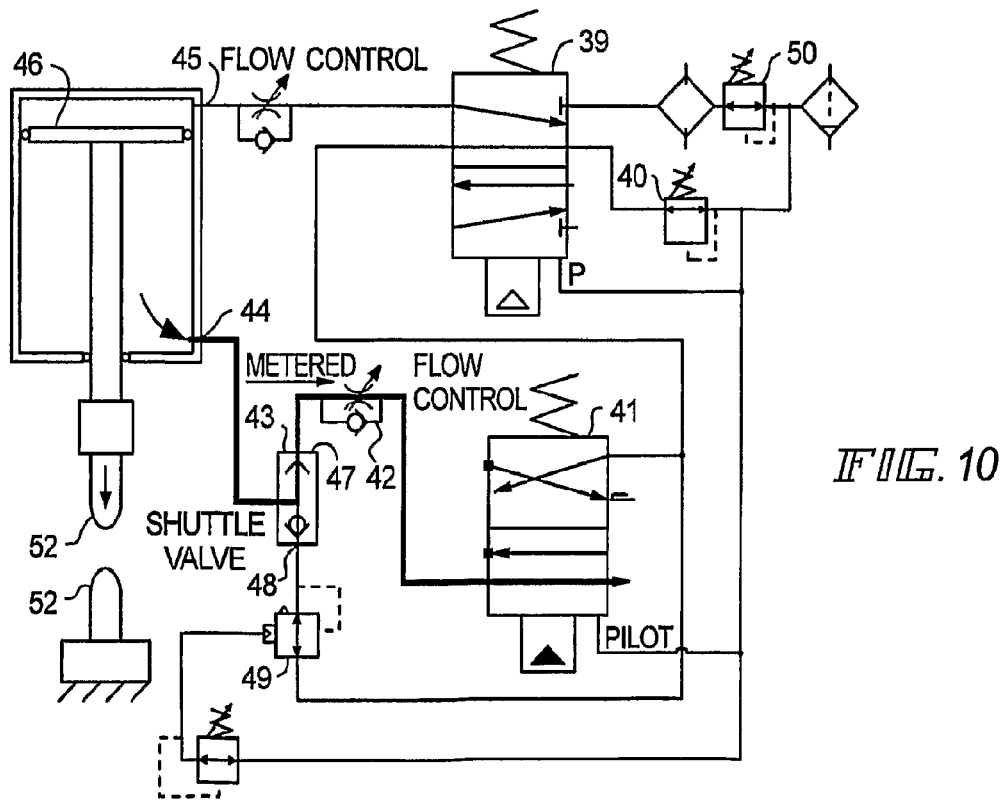
FIG. 10 is a pneumatic drawing like that of FIG. 9, but with the first stage of the ram dropping by gravity.
Figure 11:
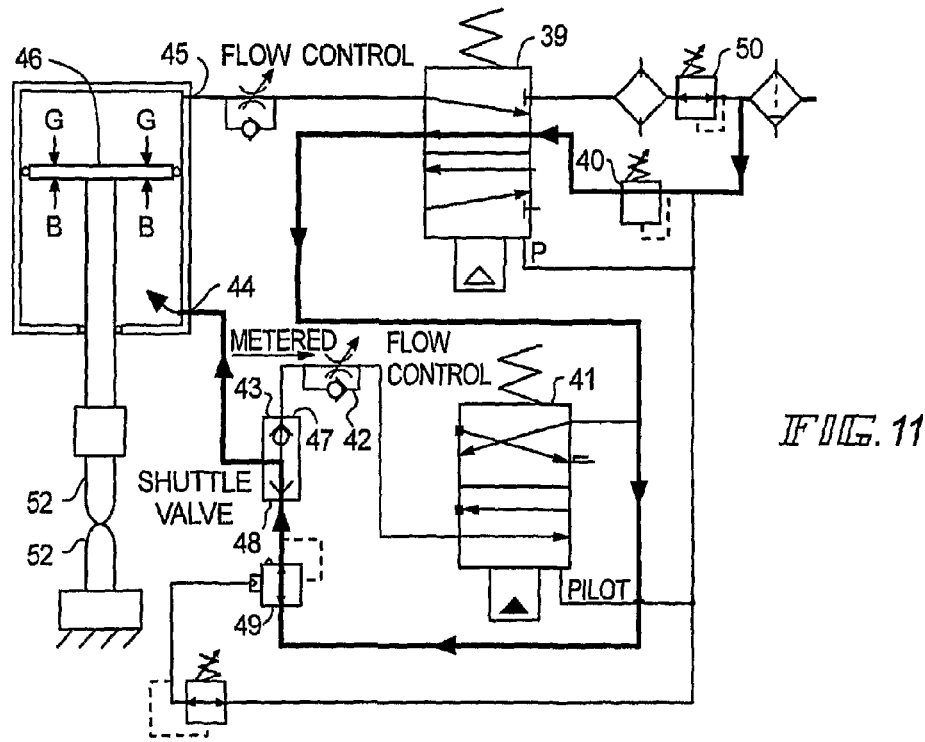
FIG. 11 is a pneumatic drawing like that of FIG. 9, with bucking pressure being applied to balance some of the ram's weight.

The sequence of events during a typical welding cycle is shown in FIG. 10. When the welding control is first initiated (closing of foot or other switch), three way solenoid valve 41 is energized to exhaust air from the bottom of the welder cylinder at port 44 through the shuttle valve 43 and to flow control valve 42. The airflow is metered by this flow control valve and moves through 3-way solenoid valve 41 to this valve's exhaust.

Lowering of air pressure on the underside of piston 46 causes the cylinder piston to drop under the force of gravity. As this happens, downward movement of the welder cylinder piston 46 pushes air out of lower port 44. Because this airflow is restricted by flow control valve 42 air in the lower portion of this cylinder is partially compressed to impose a backpressure on the underside of piston 46. This back pressure imposes an upward force on piston 46 to partially reduce the gravity-produced weight of the welder's ram. sequence, force in pounds between the welding electrodes 50 is represented by the formula:

$$F=RW-(ps\ 25.4\ mm\ (in) \times A)$$

Where:
F=force between electrodes in 0.4536 kg (pounds)
RW=gravity weight of welder ram in 0.4536 kg (pounds)
Ps 25.4 mm (in)=air pressure of regulator 49 in ps 25.4 mm (in)
A=underside area of welder cylinder piston 46 25.4 mm (in)$^2$ Force can also be calculated using the appropriate formula for metric measurements.

Figure 12:
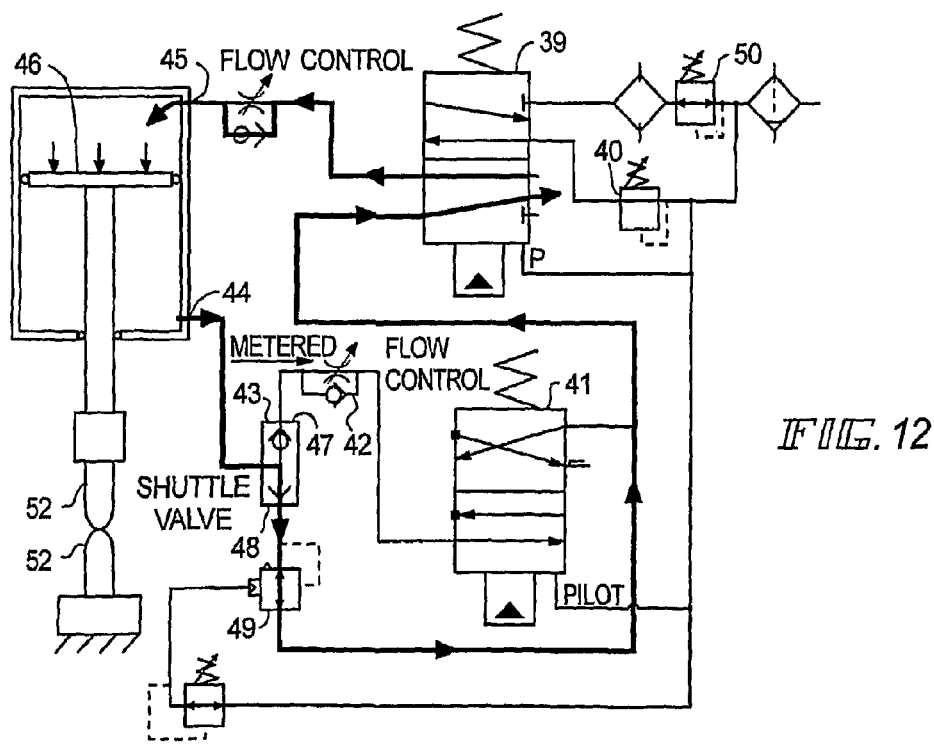
FIG. 12 is a pneumatic drawing like that of FIG. 9 with full welding force being applied if the sensor(s) has been satisfied.

FIG. 12 shows the sequence that follows if the input contact is closed from the continuity sensor (or both continuity sensor and limit switch if so installed) to the welding control within the maximum customer-set sensor time.

At this time, the control energizes solenoid valve 39 while still keeping solenoid valve 41 energized. This puts higher-pressure air, as supplied from regulator 50, on the top of the welder cylinder at port 45, and exhausts air from the bottom of the welder cylinder 44 through shuttle 43, through pressure regulator 49, and out the exhaust of solenoid 39.

When the sequence has been completed, the air on the top of the welding cylinder piston 46 will be at the level of pressure regulator 50, and the air on the bottom of the welding cylinder piston will be zero. The welding electrodes will now be at full force for welding.

At this stage of the sequence, force in pounds between the welding electrodes 50 is represented by the formula:

$$F=ps\ 25.4\ mm\ (in) \times A$$

Where:
F=force between electrodes in 0.4536 kg (pounds)
Ps 25.4 mm (in)=air pressure of regulator 50, in ps 25.4 mm (in)
A=top area of welder cylinder piston 46 25.4 mm (in)$^2$ After the weld sequence has been completed, the welding control will de-energize both solenoid valves 39, and 41 to return the welder cylinder piston 46 to the retraced position of FIG. 9. If the input is not closed from the continuity sensor (or both continuity sensor and limit switch if so installed) to the welding control within the maximum customer-set sensor time, solenoid valve 39 will not be energized, and solenoid valve 41 will be de-energized to return the welder cylinder piston 46 to the retraced position of FIG. 9.

Welders without Significant Ram Weight, and Will not Close Under Gravity;

These welder types require a different pneumatic scheme for operation.

Rocker Arm:

The typical mechanical design of one type, a rocker arm welder, is shown in FIG. 2. This type of welder typically utilizes a pivoted beam arrangement with an air cylinder on one end of the beam to close the electrodes in the opposite direction on the other end of the beam.

Unless the beam is very long and made of very heavy material, force between electrodes on this type of rocker arm welder is normally zero or very low when air is exhausted from the welding cylinder. In most cases, the electrodes will not even close when air is removed from the cylinder.

Low Ram Weight Press Welders:

A second type, as shown in FIG. 1, is a press welder that contains a ram that does not have significant weight to overcome friction in the welder cylinder and will not close the electrodes by gravity when air is removed from the welder cylinder. In the preferred embodiment of the present invention, regulated air from regulator 54 goes through 5-way solenoid valve 55 and to port 56 of the welder cylinder. This imposes air pressure on the underside of the welder cylinder piston, 57 to keep the welder cylinder piston in the retracted position and the electrodes, 53 open. On a rocker arm welder, this air cylinder is typically installed inverted from the illustration as shown in FIG. 2, but the action within the welder cylinder is identical.

Figure 14:
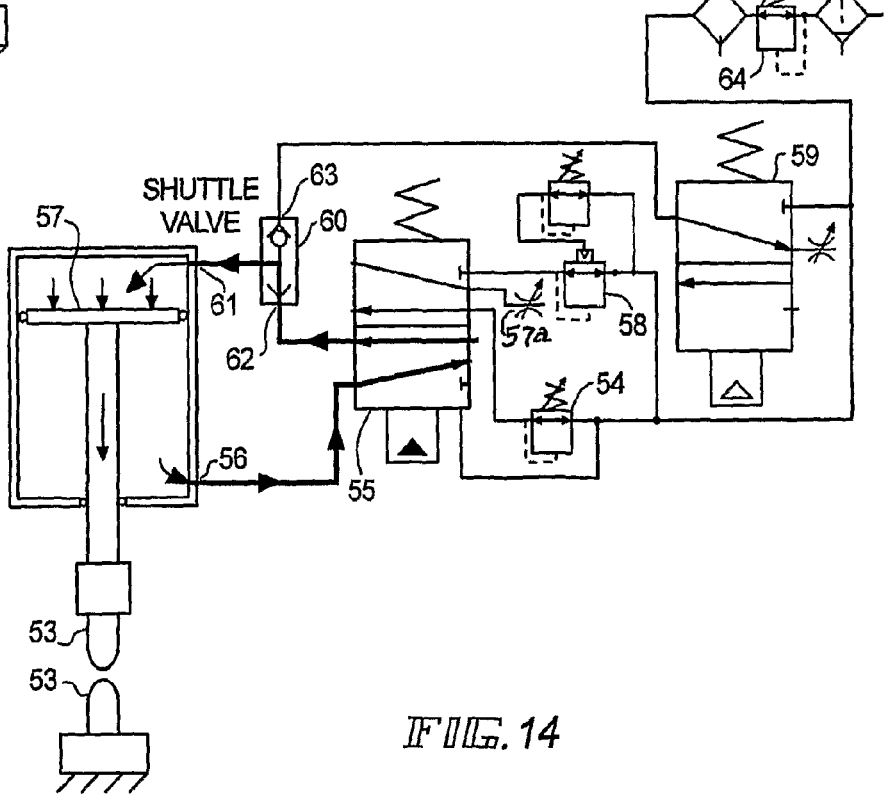
FIG. 14 is a pneumatic drawing similar to FIG. 13 with low force being applied for travel of the electrode prior to the sensor(s) being satisfied.

The sequence of events during a typical welding cycle starts as shown in FIG. 14. When the welding control is first initiated (closing of foot or other switch), five-way solenoid valve 55 is energized to exhaust air from the bottom of the welder cylinder 56 out the exhaust port of solenoid valve 55 using flow control valve 57 to meter the airflow and control the closing speed. At the same time, low-pressure air is supplied from pressure regulator 58 through 5-way solenoid valve 55 to port 62 on shuttle valve 60. Because at this time there is no pressure coming into port 63 of the shuttle valve, this low-pressure regulated air passes through to port 61 on the welder cylinder. This moves the welder piston 57 forward under low force until electrodes 53 touch. Force, in pounds, between the electrodes at this stage of the sequence for a press welder is represented by the formula:

$$F=ps\ 25.4\ mm\ (in) \times A$$

Where:
F=force between electrodes in 0.4536 kg (pounds)
Ps 25.4 mm (in)=air pressure of regulator 58, in ps 25.4 mm (in)
A=top area of welder cylinder piston 57 25.4 mm (in)$^2$ Force, in pounds, between the electrodes at this stage of the sequence for a rocker arm welder, is represented by the formula $$F = C/B \times (ps\ 25.4\ mm\ (in) \times A)$$

Where:
F=force between electrodes in A536 kg (pounds)
Ps 25.4 mm (in)=air pressure of regulator 58, in ps 25.4 mm (in)
A=top area of welder cylinder piston 57 25.4 mm (in)²
B and C=dimensions from FIG. 2

Force can also be calculated for either press or rocker arm systems using the appropriate formula for metric measurements.

Figure 15:
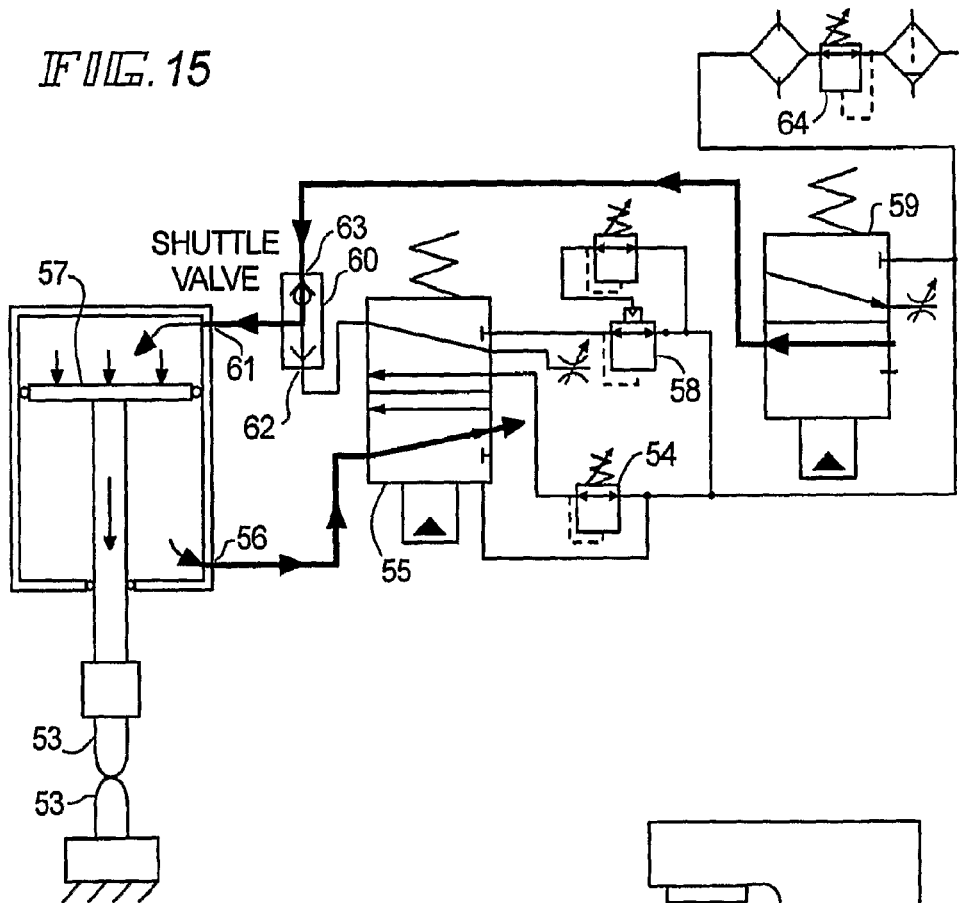
FIG. 15 is pneumatic drawing similar to FIG. 13 with full force being applied if the sensor(s) has been satisfied.

FIG. 15 shows the sequence that follows if the input contact is closed from the continuity sensor (or both continuity sensor and limit switch if so installed) to the welding control within the maximum customer-set sensor time. At this time, the control energizes solenoid valve 59 while still keeping solenoid valve 55 energized. This puts higher-pressure air, as supplied from regulator 64, into port 63 of shuttle valve 60 to shift the shuttle valve and pu higher pressure air on the top of the welder cylinder at port 61.

Force, in 0.4536 kg (pounds), between the electrodes at this stage of the sequence for a press welder is represented by the formula $$F = ps\ 25.4\ mm\ (in) \times A$$

Where:
F=force between electrodes in 0.4536 kg (pounds)
Ps 25.4 mm (in)=air pressure of regulator 64, in ps 25.4 mm (in)
A=top area of welder cylinder piston, 57, 25.4 mm (in)²

Force, in 0.4536 kg (pounds), between the electrodes at this stage of the sequence for a rocker arm welder, is represented by the formula $$F = CB \times (ps\ 25.4\ mm\ (in) \times A)$$

Where:
F=force between electrodes in 0.4536 kg (pounds)
Ps 25.4 mm (in)=air pressure of regulator 64, in ps 25.4 mm (in)
A=area of welder cylinder piston 57 25.4 mm (in)²
B and C=dimensions from FIG. 2

Force can also be calculated using the appropriate formula for metric measurements or for welder cylinders that use air-over-oil intensifier systems.

Figure 13:
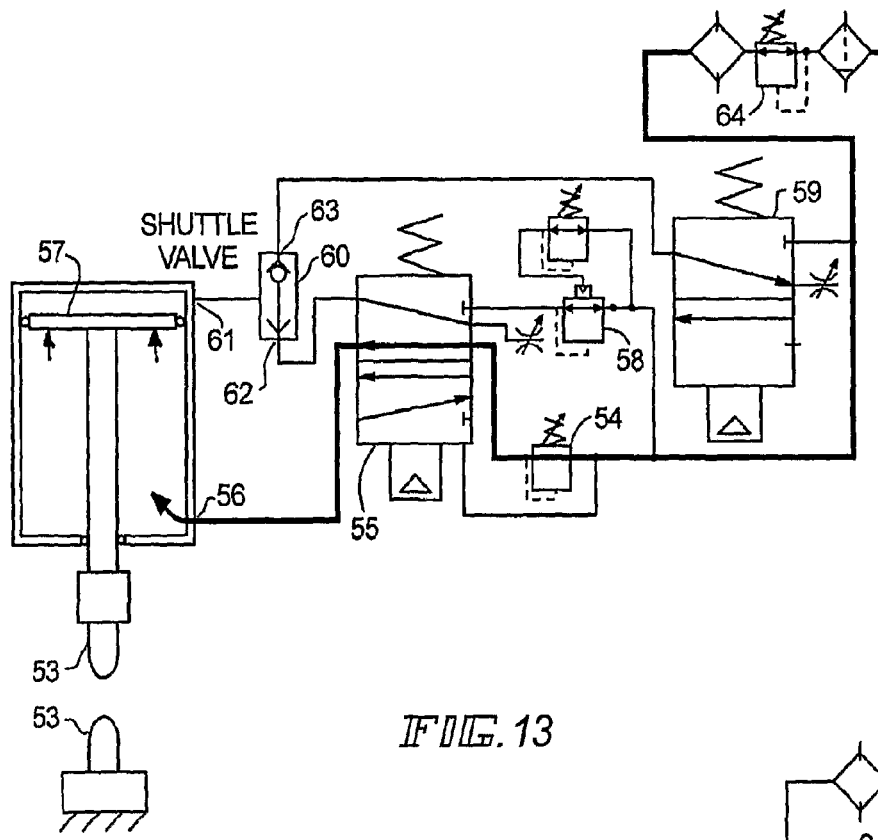
FIG. 13 is a pneumatic drawing of a typical welder embodying the present invention which is at rest that has a ram without substantial dead weight which will not close under gravity and which typically has a rocker arm welder or a welder using a fixture type package cylinder.

After the weld sequence has been completed, the welding control will de-energize both solenoid valves 55, and 59 to return the welder cylinder piston 57 to the retraced position of FIG. 13.

If the input is not closed from the continuity sensor (or both continuity sensor and limit switch if so installed) to the welding control within the maximum customer-set sensor time, solenoid valve 59 will not be energized, and solenoid valve 55 will be de-energized to return the welder cylinder piston 57 to the retraced position of FIG. 13.

Figure 16:
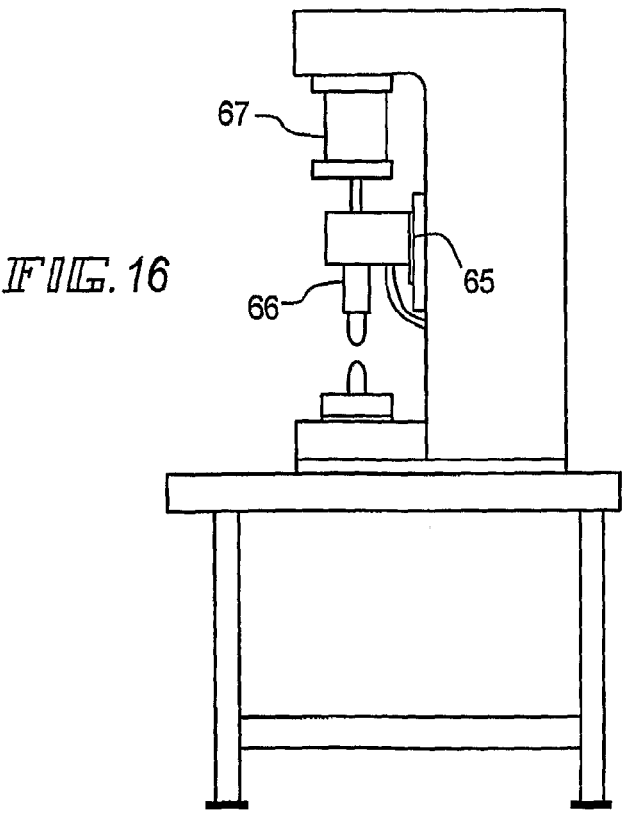
FIG. 16 illustrates the mechanical arrangement of a typical welder embodying the present invention that has a ram without substantial dead weight but that will close under gravity when air is removed from the cylinder.

Welders without Significant Weight but that Close Under Gravity:

This type of welder can use a much more simple arrangement to utilize the features of this invention. The mechanical arrangement for a press welder, as shown in FIG. 16, has enough ram weight to allow it to close under gravity but is light enough to prevent pinch point damage under gravity closing is. This type of welder typically utilizes a guided ram 65 that contains an electrode holder 66 and is activated by a cylinder 67. The cylinder can be operated directly or indirectly, by air, hydraulics, or a hybrid of the two.

Figure 17:
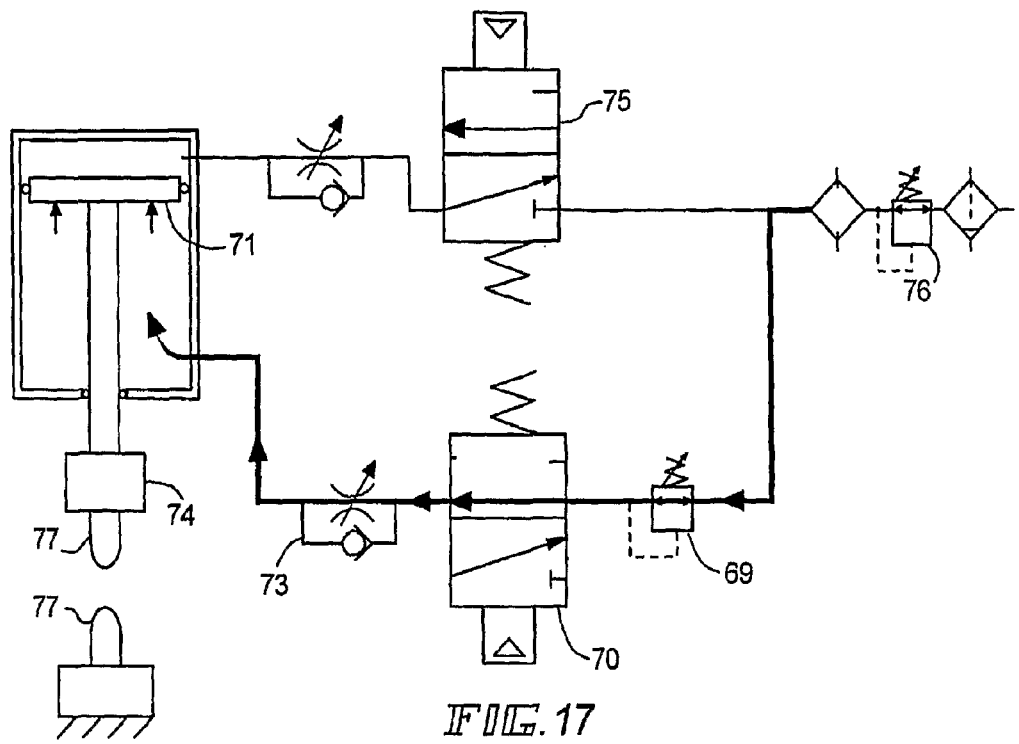
FIG. 17 is a pneumatic drawing for a system shown at rest to prevent high force applied between the electrodes, similar to that shown in FIG. 16.
Figure 18:
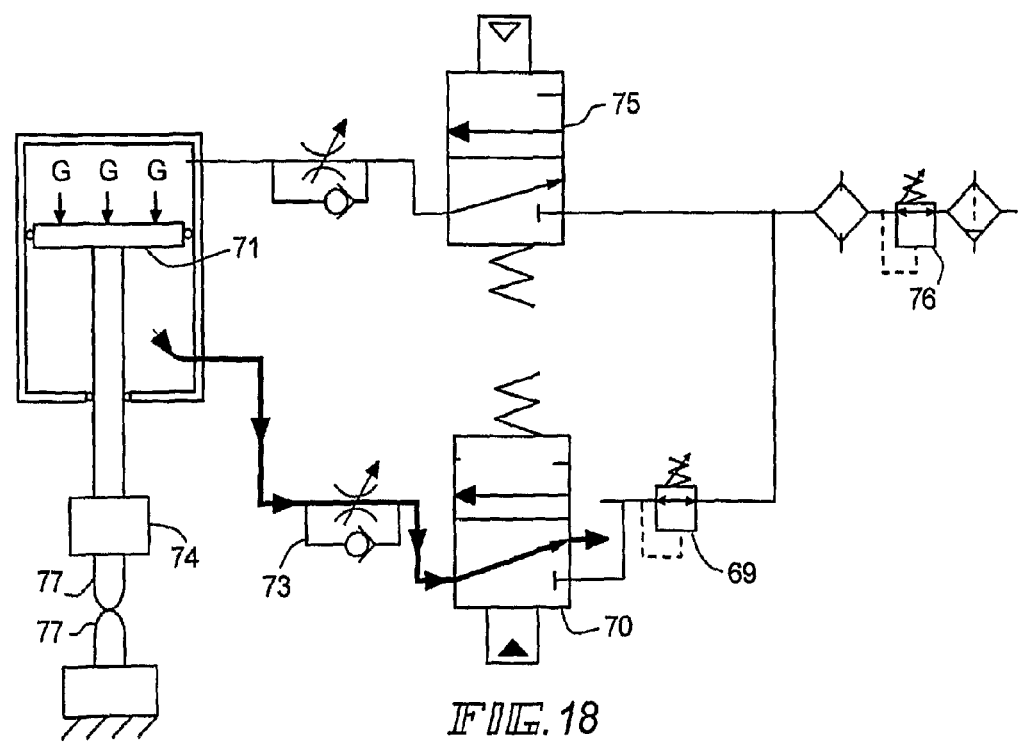
FIG. 18 is a pneumatic drawing of the system shown in FIG. 17 with the ram falling by gravity (weight of weld ram).
Figure 19:
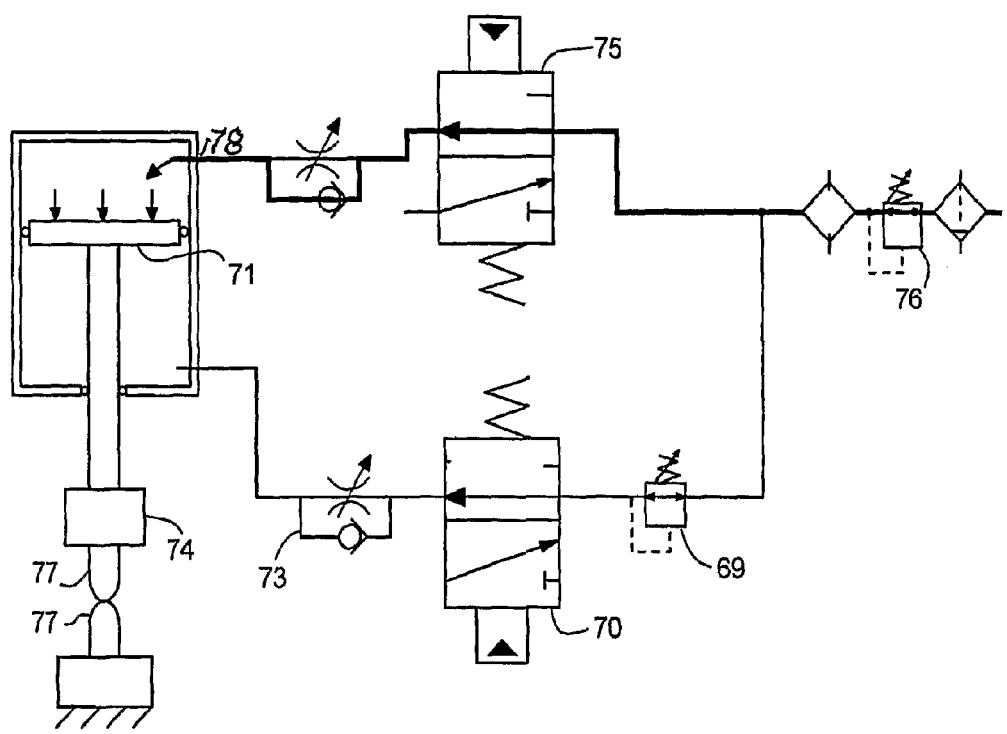
FIG. 19 is a pneumatic drawing of the system shown in FIG. 17 illustrating application of full welding force if the sensor(s) has been satisfied.

A preferred arrangement for a pneumatically operated cylinder is shown in FIG. 17. In this figure, the welder is at rest with the electrodes fully opened. Line pressure air is reduced by regulator 69 and passes through 3-way solenoid valve 70 to impose an energized to exhaust air from the bottom of the welder cylinder using flow control valve 73 to meter the airflow and control the closing speed until the electrodes touch. Force, in 0.4536 kg (pounds), between the electrodes 77 at this stage of the sequence is the dead gravity weight of the welder's ram 74 (both continuity sensor and limit switch if so installed) to the welding control within the maximum customer-set sensor time. At this time, the control energizes three-way solenoid valve 75 while still keeping solenoid valve 70 energized. This puts air, as supplied from regulator 76, on the top of the welder cylinder at port 77. Force, in pounds, between the electrodes at this stage of is represented by the formula:

$$F = psi \times A$$

Where:
F=force between electrodes in 0.4536 kg (pounds)
Ps 25.4 mm (in)=air pressure of regulator 76, in ps 25.4 mm (in)
A=top area of welder cylinder piston 25.4 mm (in)²

Force can also be calculated using the appropriate formula for metric measurements or for welder cylinders that use air-over-oil intensifier systems.

Welders that Use Servo Motors or Other Motor Driven Systems:

This type of welder utilizes a motor-driven mechanism to close the electrodes. The system embodying this invention communicates with the servo control circuitry to provide low torque prior to electrode continuity detection. If continuity is not detected prior to the maximum detection time has expired, the low-force signal to the servo control circuitry will be turned off to force the servo system to return the electrode to the fully open position.

While embodiments of the invention have been shown in considerable detail, it is not intended that the inventions should be limited to the exact construction described and many changes and modifications of the structure and methods can be made without departing from the spirit or scope of the invention.

I claim:

1. A resistance welding machine comprising:
   a frame,
   a first and a second electrode on the frame moveable with respect to one another for welding low resistance material;
   an actuator for supporting the first electrode and moving the first electrode toward and away from the second electrode between an open position and a closed position, the actuator including a cylinder with a piston therein connected to the first electrode, and a welding controller for selectively supplying high pressure or low pressure to the electrodes;
   a welding transformer with a primary and a secondary;
   an SCR contactor;
   an RC element mounted across and connected in parallel to the SCR contactor, the RC element configured to constantly develop a low voltage leakage signal coupled to the welding transformer; and
   a continuity sensor having inputs coupled to the welding transformer and configured to receive the low voltage leakage signal, the continuity sensor further configured to limit and control the electrode closing force independently from the electrode welding force until and unless only low resistance material to be welded is detected between the first and second electrodes.

2. The resistance welder of claim 1 further comprising a shuttle valve and a regulator coupled to the shuttle valve to block high pressure until only low resistance material is detected between the electrodes.

3. The resistance welding machine of claim 1 further comprising:
   a welding controller;
   an initiation switch; and
   a valve, wherein the valve is configured to be energized by the welding controller for bringing said electrodes together, and wherein the welding controller prevents valve to close if low resistance material is detected between the first and second electrodes at the same time as the initiation switch is closed.

4. A resistance welder comprising:
   a welding circuit comprising an RC element mounted across an SCR contactor, the SCR contactor electrically coupled to a primary of a welding transformer, the RC element constantly developing a low voltage leakage signal on a welding transformer;
   a ram;
   electrodes mechanically coupled to the ram and electrically coupled to a secondary of the welding transformer;
   a pneumatic system configured to counterbalance a portion of the weight of the ram;
   a continuity sensor configured to ascertain a presence of low resistance material between the electrodes, the continuity sensor comprising:
      an isolation transformer coupled to the welding transformer and configured to receive the low voltage leakage signal,
      an amplifier integrator coupled to the isolation transformer,
      a RMS converter coupled to the amplifier integrator and configured to output a conditioned voltage, and
      a comparator configured to receive the conditioned voltage and to output a detection signal indicative of detection of low resistance material between the electrodes in response to determining that the conditioned voltage is below a reference level; and
   a controller coupled to the output of the comparator and configured to receive the detection signal and responsively ascertain that a high force is to be applied to the electrodes, the controller further configured to:
      activate a low pressure solenoid valve prior to determining that the high force is to be applied to the electrodes; and
      activate a high pressure solenoid valve after determining that the high force is to be applied to the electrodes.

5. The resistance welder of claim 4 further comprising multiple welding heads, and wherein the pneumatic system is configured to close the welding heads with low force prior to the controller determining that the high force is to be applied to the electrodes.

6. The resistance welder of claim 4 further comprising a relay coupled between the comparator and the controller, the relay configured to receive the detection signal from the comparator and to relay the detection signal to the controller.

7. The resistance welder of claim 4, wherein the controller is further configured to:
   determine, before activating the low pressure solenoid valve, that the detection signal indicates detection of low resistance material between the electrodes; and
   determine, before activating the low pressure solenoid valve, to withhold activation of the low pressure solenoid valve and to lock out a weld cycle in response to determining that the detection signal indicates detection of low resistance material between the electrodes.

8. A pinch point safety sensor for a resistance welder, the resistance welder having electrodes and a SCR contactor coupled to the electrodes, the pinch point safety sensor comprising:
   an RC element mounted across and connected parallel to the SCR contactor, the RC element configured to develop a low voltage leakage signal;
   a continuity sensor coupled to the electrodes and configured to receive the low voltage leakage signal and to detect whether low resistance material to be welded is between the electrodes; and
   a controller configured to limit and control electrode closing force independently of electrode welding force pressure until and unless only low resistance material to be welded is detected between the electrodes by the continuity sensor, wherein low closing force pressure is automatically removed if continuity is not detected between the electrodes within a maximum detected time, so that the electrodes are returned to an open position.

9. The pinch point safety sensor of claim 8, wherein the controller is further configured to set a maximum user detected time, whereby the low closing force pressure is automatically removed if continuity is not detected between the electrodes within the maximum user set detected time and the electrodes are returned to an open position.

10. The pinch point safety sensor of claim 8 further comprising:
    a valve energized by the controller;
    an initiation switch, wherein closure of the initiation switch enables electrodes to be brought together; and
    valves that prevent the electrodes from closing if continuity is detected at the same time that the initiation switch is closed.

11. The pinch point safety sensor recited in claim 8, wherein the electrodes remain closed until a weld is completed.

12. A resistance welder comprising:
    a welding transformer having a transformer primary and a transformer secondary;
    electrodes coupled to the transformer secondary;
    a SCR contactor coupled to the transformer primary and to an AC power line;
    an RC element coupled in parallel across the SCR contactor between the AC power line and the transformer primary, the RC element configured to constantly develop a low voltage leakage signal on the transformer;
    a continuity sensor coupled to the transformer and configured to receive the low voltage leakage signal and to detect whether low resistance material to be welded is between the electrodes; and
    a controller coupled to the continuity sensor and configured to perform an initiation check by being configured to:
       determine, before activating a low pressure solenoid valve that effects closure of the electrodes under low force, that the continuity sensor detects low resistance material between the electrodes; and determine to withhold activation of the low pressure solenoid valve and to lock out a weld cycle in response to determining that the continuity sensor detects low resistance material between the electrodes before activating the low pressure solenoid valve.

13. The resistance welder of claim 12 further comprising a pressure regulator to regulate electrode closing force, and an electric circuit configured to inhibit application of high force on the electrodes until and unless the continuity sensor detects low resistance material between the electrodes after the low pressure solenoid valve has effected closure of the electrodes under low force.

14. The resistance welder of claim 12 further comprising a pneumatic system including a piston, the pneumatic system configured to provide the low force on one side of the piston, which low force can be adjusted independently of a shaft cylinder diameter of the piston.

15. The resistance welder of claim 12 further comprising a weld force regulator configured to regulate a high force during a welding cycle, wherein the high force is adjusted independent of the low force under which closure of the electrodes is effected.

16. The resistance welder of claim 12 further comprising a high pressure regulator, wherein a pneumatic system counterbalances the electrodes independently of a pressure setting set in the high pressure regulator.

* * * * *